United States Patent

Tsutsumi et al.

Patent Number: 5,961,411
Date of Patent: Oct. 5, 1999

[54] TRAVELING GUIDE SHOE FOR A ROLLER CHAIN

[75] Inventors: Kazuhiko Tsutsumi, Nagoya; Kazuhiko Shimaya, Hidaka; Atsushi Kumakura, Tokorozawa, all of Japan

[73] Assignee: Tsubakimoto Chain Co., Osaka, Japan

[21] Appl. No.: 08/986,551

[22] Filed: Dec. 8, 1997

[30] Foreign Application Priority Data

Dec. 19, 1996 [JP] Japan .................................. 8-339492

[51] Int. Cl.⁶ ...................................................... F16H 7/18
[52] U.S. Cl. ............................................ 474/111; 474/140
[58] Field of Search ..................................... 474/111, 140, 474/101, 135, 136

[56] References Cited

U.S. PATENT DOCUMENTS

| | | | |
|---|---|---|---|
| 4,798,562 | 1/1989 | Matson et al. ........................ | 474/101 |
| 4,832,664 | 5/1989 | Groger et al. ........................ | 474/111 |
| 4,921,472 | 5/1990 | Young ................................. | 474/111 |
| 5,000,724 | 3/1991 | Reid .................................... | 474/111 |
| 5,045,032 | 9/1991 | Suzuki et al. ....................... | 474/140 |
| 5,248,282 | 9/1993 | Suzuki ................................. | 474/110 |
| 5,318,482 | 6/1994 | Sato et al. .......................... | 474/111 |
| 5,425,680 | 6/1995 | Young ................................. | 474/111 |

FOREIGN PATENT DOCUMENTS

| | | |
|---|---|---|
| 3738895 | 6/1989 | Germany . |
| 19747163 | 4/1998 | Germany . |
| 742092 | 12/1955 | United Kingdom . |
| 2261276A | 5/1993 | United Kingdom . |

Primary Examiner—Tamara L. Graysay
Assistant Examiner—Debra A. Belles
Attorney, Agent, or Firm—Dann, Dorfman, Herrell & Skillman; Henry H. Skillman

[57] ABSTRACT

For enhanced durability, a traveling guide shoe for a roller chain has a cross-sectional shape with a base slide guide surface 12 which engages only the bottoms of the side link plates of the chain on a chain-incoming-end, a projecting rolling guide surface 13 which engages only the rollers of the chain at an intermediate portion of the shoe. The base surface 12 and the projecting surface 13 are connected with each other through a continuous transfer surface 13.

13 Claims, 4 Drawing Sheets

TRAVELING GUIDE SHOE FOR A ROLLER CHAIN

FIELD OF THE INVENTION

The present invention relates to a traveling guide shoe for a roller chain stretched, for example, in an endlessly entrained manner between sprockets which are mounted respectively on a crank shaft and a cam shaft in an engine compartment.

BACKGROUND OF THE INVENTION

A conventional traveling guide shoe for a roller chain such as, for example, a tensioner shoe or a guide shoe, has a cross-sectional shape which is substantially uniform throughout the whole length of the shoe. The shoe is in pressure-bearing contact with a run of a roller chain throughout the length of the shoe.

For example, FIGS. 4 and 5 show conventional cross-sectional shapes. In the cross-sectional shape of a shoe 1A shown in FIG. 4, a projecting rolling guide surface 2A bears against only rollers R of a roller chain C, and displacement of the chain C is restrained by both side faces of the projecting surface 2A. In the cross-sectional shape of a shoe 1B shown in FIG. 5, a base slide guide surface 2B bears against only the bottom faces of link plates L1 and L2 of the roller chain C, and lateral displacement of the chain C is restrained by a pair of upright guide surfaces 3, 3 projecting upwardly at both side edges of the base surface 2B.

In the prior art shown in FIG. 4, at the incoming end of the shoe 1A, each roller R of the roller chain passes into engagement with the incoming end of the projecting rolling guide surface 2A, thereby causing intermittent striking against the incoming end, and marked wear and deterioration of durability arises. The prior art shown in FIG. 5 also involves the drawback that an increase in the chain traveling resistance caused by a sliding friction of the link plate bottom faces and an increase of sliding wear are unavoidable. As another drawback, the paired upright guide surfaces 3,3 projected on both side edges of the shoe cause an increase in the width of the shoe.

SUMMARY OF THE INVENTION

The present invention has solved the above-mentioned problems by means of a traveling guide shoe for a roller chain wherein, in a cross-sectional shape of the shoe, which is not substantially uniform throughout the whole length of the shoe, a base slide guide surface which bears only the bottom faces of chain link plates is formed longitudinally on a chain-incoming-end of the shoe, a projecting rolling guide surface which bears only chain rollers is formed longitudinally at an intermediate portion of the shoe, and the said base surface and projecting surface are connected with each other through a continuous transfer surface.

Since the traveling guide surface of the shoe has a base slide guide surface on the roller chain incoming end, bottom faces of link plates slide on the said base surface continuously while the chain travels. Therefore, an intermittent impact force is not imposed on the said base surface. Besides, at the continuous transfer surface which is continuous from the base slide guide surface of the shoe to the projecting rolling guide surface thereof, the rollers passing intermittently come into abutment with the said transfer surface gradually and move onto the said projecting surface, so an intermittent impact force of the rollers is not imposed on the transfer surface. Further, on the projecting surface, the link plate bottom faces are in an elevated state from the base surface while the chain travels, and lateral displacement of the chain is restrained by the link plates positioned on both sides of the projecting surface.

BRIEF DESCRIPTION OF THE DRAWINGS

All of the objects of the present invention are more fully set forth hereinafter with reference to the accompanying drawings, wherein.

DETAILED DESCRIPTION OF A PREFERRED EMBODIMENT OF THE INVENTION

Figure 1:
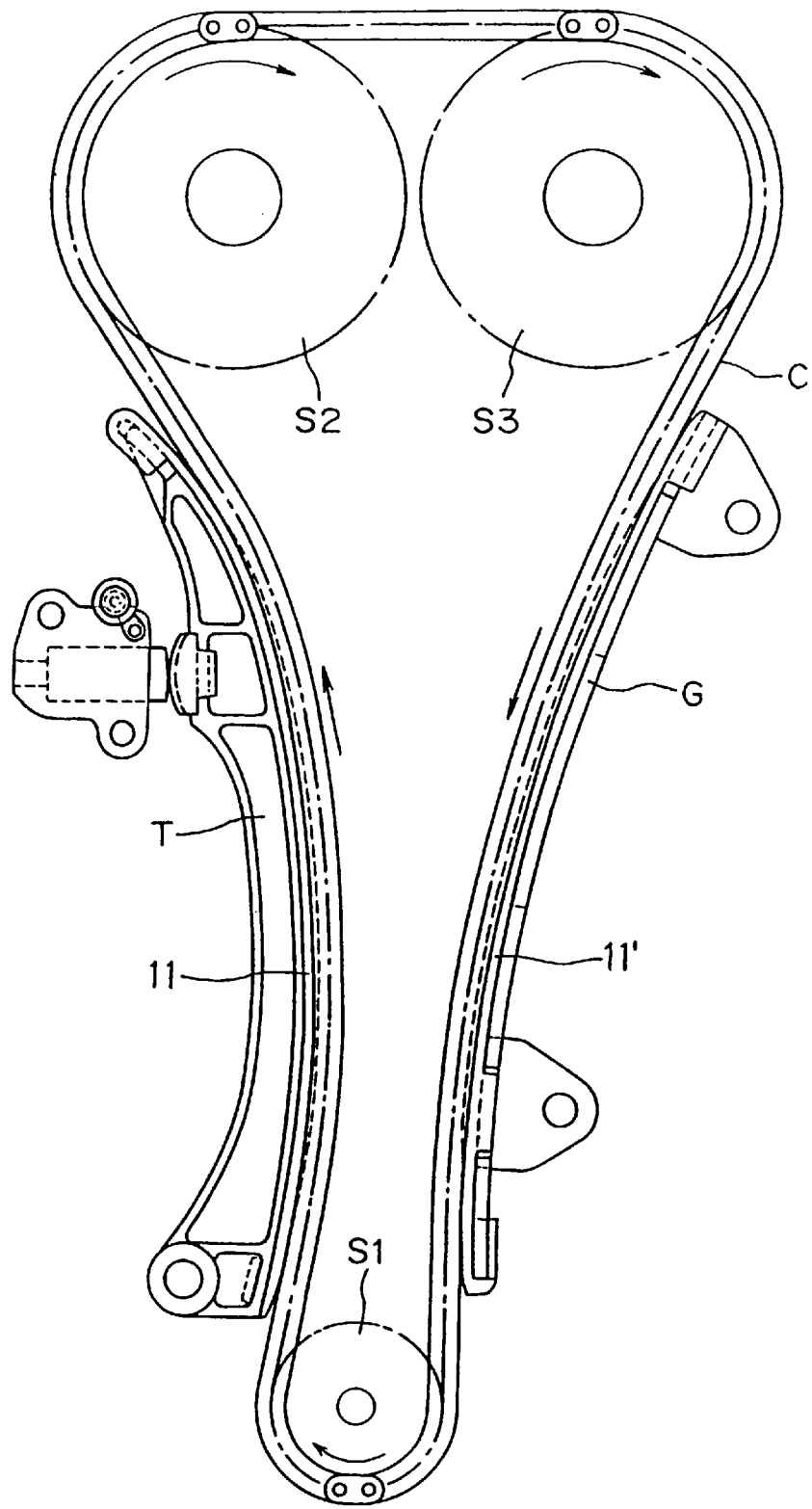
FIG. 1 is a front view showing an embodiment of the present invention.

FIG. 1 is a front view showing a roller chain as a timing chain stretched between a driving sprocket Si mounted on a crank shaft in an engine compartment and a pair of driven sprockets S2, S3 mounted on cam shafts. The roller chain travels in the arrowed direction. A tensioner T and a guide member G are in pressure contact with the roller chain for maintaining the tension of the roller chain appropriately and for guiding the travel of the same.

A traveling guide shoe 11 embodying the present invention may comprise a shoe of the tensioner T and a shoe of the guide member G.

The roller chain C advances in the direction indicated by the arrows in FIG. 1. The shoe of the tensioner T is of the same shape as the shoe of the guide member G. The chain-incoming-end of the guide shoe 11 is at the lower end of the tensioner T and is at the upper end of the guide member G in FIG. 1. The chain C comprises transverse rollers R rotatably mounted between transversely-spaced parallel longitudinal link plates L-1 and L-2. The plates have a height greater than the height of the rollers which are centered in the link plates so that the plates project above and below the rollers at the opposite ends of the rollers, and there is a clearance space below the rollers when the link plates travel on a base surface 12 of the shoe 11.

Figure 2:
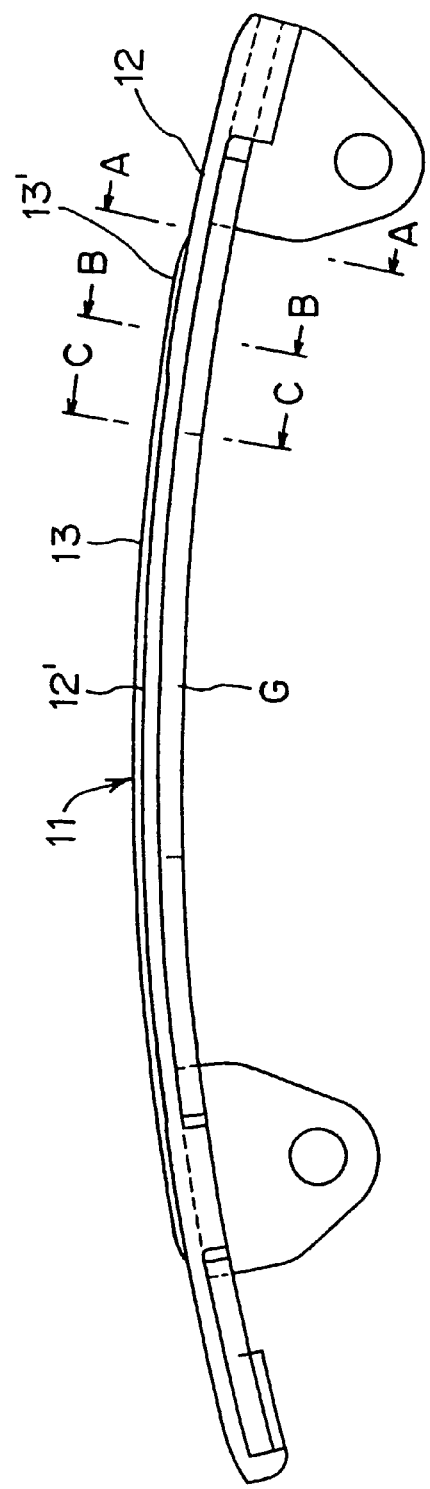
FIG. 2 is a front view of a chain travel guide shoe.
Figure 3A:
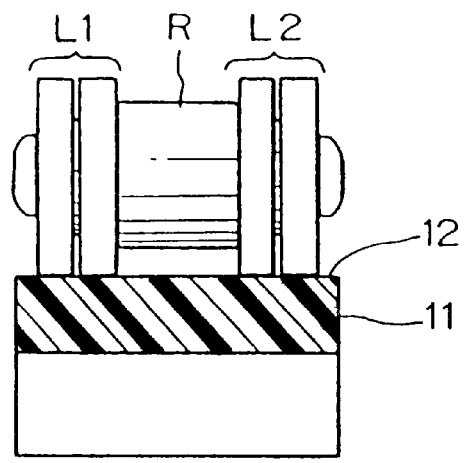
FIG. 3(A) is an enlarged cross-sectional view of the shoe taken on line 3A—3A in FIG. 2.
Figure 3B:
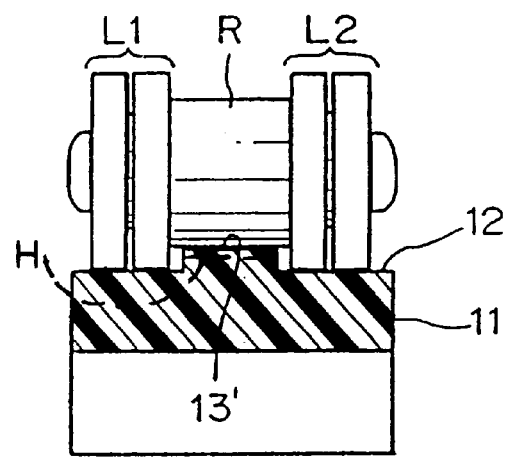
FIG. 3(B) is a sectional view taken on line 3B—3B in FIG. 2.
Figure 3C:
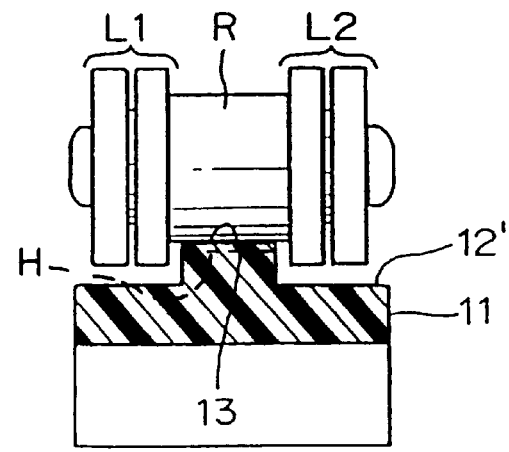
FIG. 3(C) is a sectional view taken on line 3C—3C in FIG. 2.
Figure 4:
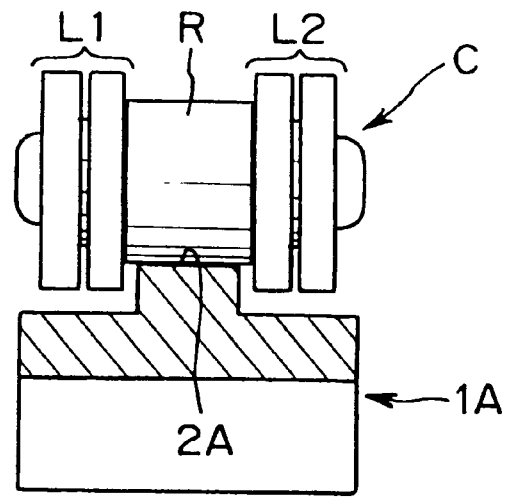
FIG. 4 is a sectional view of a conventional chain travel guide shoe using a projecting surface.

At the chain-incoming-end of the guide shoe 11, as shown in FIG. 3(A), the bottom faces of the link plates L1 and L2 are in sliding contact with and supported by a base slide guide surface 12, but the rollers R are spaced above the base surface 12. Spaced from the incoming end, the shoe has an intermediate portion with an upstanding rolling guide surface 13 projecting above the base surface, designated 12' in FIGS. 2 and 3(C). At the ends of the intermediate portion, a transfer surface 13' forms exit and entrance ramps which extend continuously from the base surface to said rolling guide surface. As shown in FIG. 3(B), the roller R begins to contact the continuous transfer surface 13' which connects the base surface 12 and the projecting rolling guide surface 13 shown in FIG. 3(C) with each other, while the link plate bottom faces are in light contact with the base surface 12. In FIG. 3(C), the roller R moves completely onto the projecting rolling guide surface 13, and the link plate bottom faces are completely elevated from the base slide guide surface 12' because the height of the surface 13 is greater than the clearance space below the rollers R.

For maintaining the height of the projecting rolling guide surface 13 at an intermediate portion of the shoe, the base slide guide surface 12' at the intermediate portion may be recessed, so as to be lower than the base surface 12 formed on the chain incoming end, as shown in FIG. 2.

The projecting rolling guide surface 13 may extend up to the exit end of the shoe where the chain C disengages from the shoe, or may be connected to the base slide guide surface through a continuous transfer surface spaced from the exit end, forming an exit ramp as shown in FIG. 2.

In the drawing, the base surface and projecting surface of the traveling guide shoe are formed integrally with a hardened projecting surface indicated by broken lines H in FIGS. 3(B) and 3(C). The shoe may be formed using a plastic, e.g. a polyamide, or a rubber such as acrylonitrile-butadiene rubber (NBR), e.g. nitrile rubber, provided this constitutes no limitation. Alternatively, the base surface may be formed using polyamide or NBR, while the projecting surface may be formed using carbon steel or a ferrous sintered material so as to be harder than the base surface. Further, a surface hardening treatment such as indication hardening may be applied to the said projecting surface, whereby wear of the projecting surface caused by rolling of the rollers thereon can be further diminished. Preferably, the projecting surface portion is formed separately from the base surface portion, and then both are combined together. This construction makes it convenient for replacement of the projecting portion in case of wear.

According to the present invention, in a cross-sectional shape of a traveling guide shoe for a roller chain, a base slide guide surface which bears only bottom faces of link plates is formed longitudinally on an incoming end of the shoe, a projecting rolling guide surface which bears only rollers is formed longitudinally at an intermediate portion of the shoe, and the base surface and the projecting surface are connected with each other through a continuous transfer surface. In this construction, bottom faces of link plates slide and pass the base surface continuously without exerting any intermittent impact on the base surface and hence there is attained improvement of durability. Moreover, at the continuous transfer surface, since each roller comes into contact with the projecting surface gradually, intermittent impacts on the rollers are diminished. Further, on the projecting rolling guide surface in the intermediate portion of the shoe, the rolling of the roller diminishes the traveling resistance of the chain, but transverse displacement of the chain is suppressed because both sides of the projecting surface restrain transverse displacement of the link plates, and provide an exact guide for the chain.

By making the hardness of the projecting surface higher than that of the base surface, wear of the projecting surface is diminished, so that the height of the projecting surface can be maintained and the link plate bottom faces are prevented from coming into sliding contact with the base slide guide surface at the intermediate portion, whereby an increase of the chain traveling resistance can be prevented.

Figure 5:
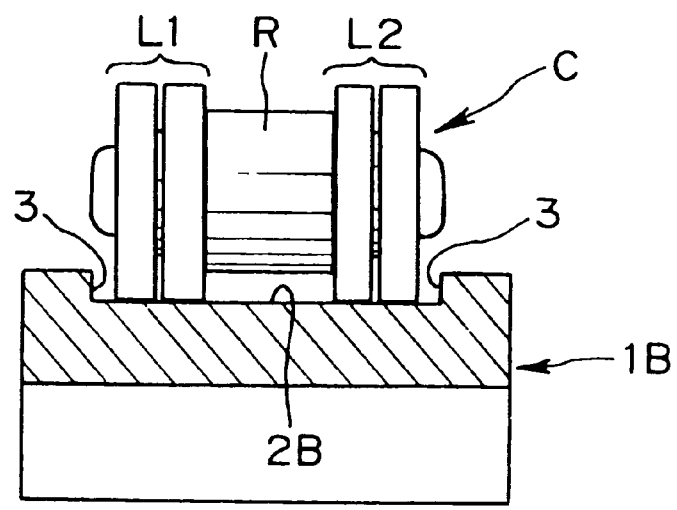
FIG. 5 is a sectional view of a conventional chain travel guide shoe using a recessed base surface.

Further, the central projecting surface engages the chain between the link plates L1 and L2 and it is not necessary for the shoe 11 to project transversely beyond the chain. Thus, the upright projecting guide surfaces as shown in FIG. 5 are not necessary and the width of the shoe can be decreased.

Hence, it is possible to afford a durable shoe of a small width. Thus, outstanding effects can be attained by the present invention.

While a particular embodiment of the invention has been herein illustrated and described, it is not intended to limit the invention to such disclosures, but changes and modifications may be made therein and thereto within the scope of the following claims.

We claim:

1. A traveling guide shoe for use with an associated roller chain comprising transverse rollers rotatably mounted between transversely-spaced parallel longitudinal link plates, said shoe having an incoming end, an exit end, and a shape for pressure-bearing contact with the associated roller chain adapted to move into contact with the shoe at said incoming end and to move out of contact with the shoe at said exit end, a longitudinal base slide guide surface at at least one of said incoming end and said exit end, adapted to engage the associated roller chain, and adapted to bear only on the chain link plates of the associated roller chain, a longitudinal projecting rolling guide surface adapted to engage the associated roller chain and adapted to bear only on the transverse chain rollers of the associated roller chain, said rolling guide surface being positioned at an intermediate portion of the shoe between said incoming and exit ends, and being spaced from said at least one of said ends to provide a space between said rolling guide surface and said at least one end, said base surface and said projecting surface being connected with each other through a continuous transfer surface in said space.

2. A traveling guide shoe for use with a roller chain according to claim 1, wherein said projecting rolling guide surface has a hardness higher than that of said base slide guide surface.

3. A traveling guide shoe according to claim 1 wherein said base guide surface extends transversely and is dimensioned, when engaging the associated roller chain, to underlie said link plates, and said projecting guide surface is dimensioned, when engaging the associated roller chain, to extend transversely intermediate the link plates.

4. A traveling guide shoe according to claim 1 wherein said continuous transfer surface comprises an entrance ramp spaced longitudinally from said incoming end, and said base surface extends longitudinally from said incoming end beyond said entrance ramp.

5. A traveling guide shoe according to claim 4 wherein said projecting surface extends longitudinally from said entrance ramp toward said exit end.

6. A traveling guide shoe according to claim 5 wherein said base surface extends longitudinally along the entire length of the shoe from said incoming end to said exit end, said shoe having a second continuous transfer surface comprising an exit ramp spaced longitudinally from the exit end of the shoe, said projecting surface extending longitudinally between said entrance and exit ramps, and being spaced from said entrance and exit ends.

7. A traveling guide shoe according to claim 6 wherein said base surface is recessed in said intermediate portion of the shoe between said entrance ramp and said exit ramp.

8. A traveling guide shoe according to claim 1 for use with an associated chain having link plates with a given height and rollers of lesser height centered in the link plates to provide clearance spaces above and below the rollers, said projecting surface having a height above said base surface which is greater than the clearance spaces, whereby said continuous transfer surface is adapted to elevate the link plates of the associated chain above said base surfaces when said rollers of the associated chain move along said continuous transfer surface from said incoming end toward said exit end of the shoe.

9. A traveling guide shoe for use with an associated roller chain comprising transverse rollers rotatably mounted between transversely-spaced parallel longitudinal link plates, said shoe having an incoming end, an exit end, and a shape for pressure-bearing contact with the associated roller chain adapted to move into contact with the shoe at said incoming end and to move out of contact with the shoe at said exit end, a longitudinal base slide guide surface at each of said incoming end and said exit end, adapted to engage the associated roller chain, and adapted to bear only on the chain link plates of the associated roller chain, a longitudinal projecting rolling guide surface adapted to engage the associated roller chain and adapted to bear only on the transverse chain rollers of the associated roller chain, said rolling guide surface being positioned at an intermediate portion of the shoe between said incoming and exit ends, and being spaced from each of said ends to provide a space between said rolling guide surface and each of said ends, said base surface and said projecting surface being connected with each other through continuous transfer surfaces in said spaces.

10. A traveling guide shoe for use with a roller chain according to claim 9, wherein said projecting rolling guide surface has a hardness higher than that of said base slide guide surface.

11. A traveling guide shoe according to claim 9 wherein said base guide surface extends transversely and is dimensioned, when engaging the associated roller chain, to underlie said link plates, and said projecting guide surface is dimensioned, when engaging the associated roller chain, to extend transversely intermediate said link plates.

12. A traveling guide shoe according to claim 9 wherein said base surface extends continuously longitudinally on opposite sides of said rolling guide surface between said continuous transfer surfaces at each of said ends.

13. A traveling guide shoe according to claim 12 for use with an associated chain having link plates with a given height and rollers of lesser height centered in the link plates to provide clearance spaces above and below the rollers, said projecting surface having a height above said base surface which is greater than the clearance spaces, whereby said continuous transfer surface is adapted to elevate the link plates above said base surfaces when the rollers move along said continuous transfer surface from said incoming end toward said exit end of the shoe.

* * * * *

UNITED STATES PATENT AND TRADEMARK OFFICE
CERTIFICATE OF CORRECTION

PATENT NO. : 5,961,411

DATED : October 5, 1999

INVENTOR : Tsutsumi et al.

It is certified that errors appear in the above-identified patent and that said Letters Patent is hereby corrected as shown below:

Column 2, line 29, change "Si" to --S1--;

line 52, before "shoe 11" insert --guide--.

Signed and Sealed this

Thirteenth Day of June, 2000

*Attest:*

Q. TODD DICKINSON

*Attesting Officer*      Director of Patents and Trademarks